United States Patent [19]

Albrecht et al.

[11] 4,199,188

[45] Apr. 22, 1980

[54] VEHICLE ACCESSORY SYSTEM

[75] Inventors: Leonard N. Albrecht, Beverly Hills; Bert C. Taylor, Jr., Los Angeles, both of Calif.

[73] Assignee: Access-O-Trac, Beverly Hills, Calif.

[21] Appl. No.: 866,495

[22] Filed: Jan. 3, 1978

Related U.S. Application Data

[63] Continuation-in-part of Ser. No. 824,165, Aug. 12, 1977, abandoned, which is a continuation of Ser. No. 603,360, Aug. 11, 1975, abandoned.

[51] Int. Cl.$^2$ ................................................ B60P 7/02
[52] U.S. Cl. ............................... 296/100; 296/137 H
[58] Field of Search .............. 296/10, 137 R, 137 E, 296/137 G, 137 H, 100, 154; 105/466, 467, 468

[56] References Cited

U.S. PATENT DOCUMENTS

| | | | |
|---|---|---|---|
| 1,514,381 | 11/1924 | Gray | 296/137 R |
| 2,122,712 | 7/1938 | Bishop | 296/137 E |
| 2,909,387 | 10/1959 | Burtzloff | 296/10 |
| 3,165,762 | 1/1965 | Hage | 296/137 R |
| 3,342,523 | 9/1967 | Lutgen | 296/100 |
| 3,596,980 | 8/1971 | Cadiou | 296/154 |
| 3,773,380 | 11/1973 | Stockdill | 296/137 D |

*Primary Examiner*—Joseph F. Peters, Jr.
*Assistant Examiner*—John A. Carroll
*Attorney, Agent, or Firm*—Allan R. Fowler

[57] ABSTRACT

A pair of rails mounted on top of the sidewalls of a pickup truck bed, with each rail forming a channel with a slot at the top, to receive mounting feet of accessories. One accessory is in the form of three cover sections with mounting feet received in the channels, and with cover sheet portions that extend beyond the slots and down to at least the rail height to prevent the entrance of water into the truck bed. The rearmost section has a depending flange which lies below the level of the tailgate, so that when the tailgate is locked up, the accessories cannot be removed. When the sections are locked in their adjoining relationship, a U-shaped elastomeric member and a trough enable a compliant, elastic seal between adjoining sections. The cover sections may have sidewalls of substantial height to allow use of the truck as a van or camper. In one variation, the sidewalls are hinged to the top portion of each cover section to permit folding of each section to a relatively flat compact configuration for compact storage when removed from the rails. Also, the truck body provides the support or anchoring points for developing the compression forces which lock the cover sections together, either directly i.e. cab to tailgate or indirectly via front and rear enclosing sections.

27 Claims, 34 Drawing Figures

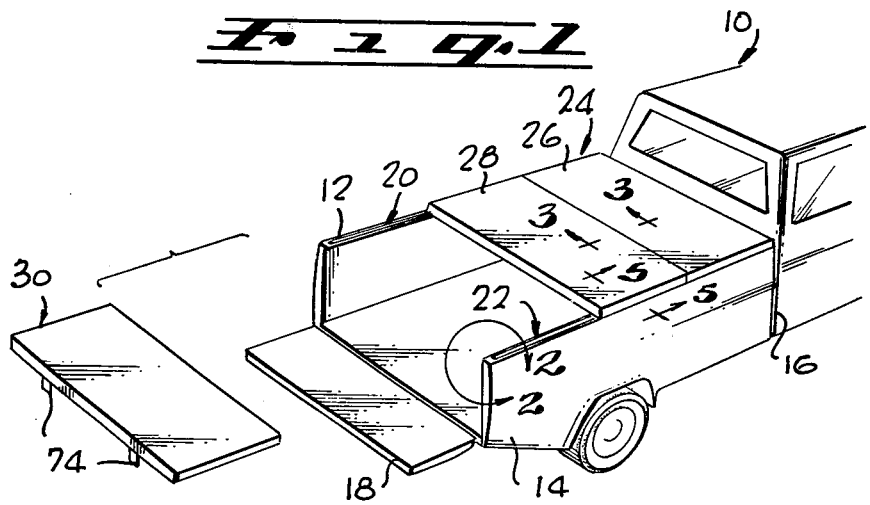
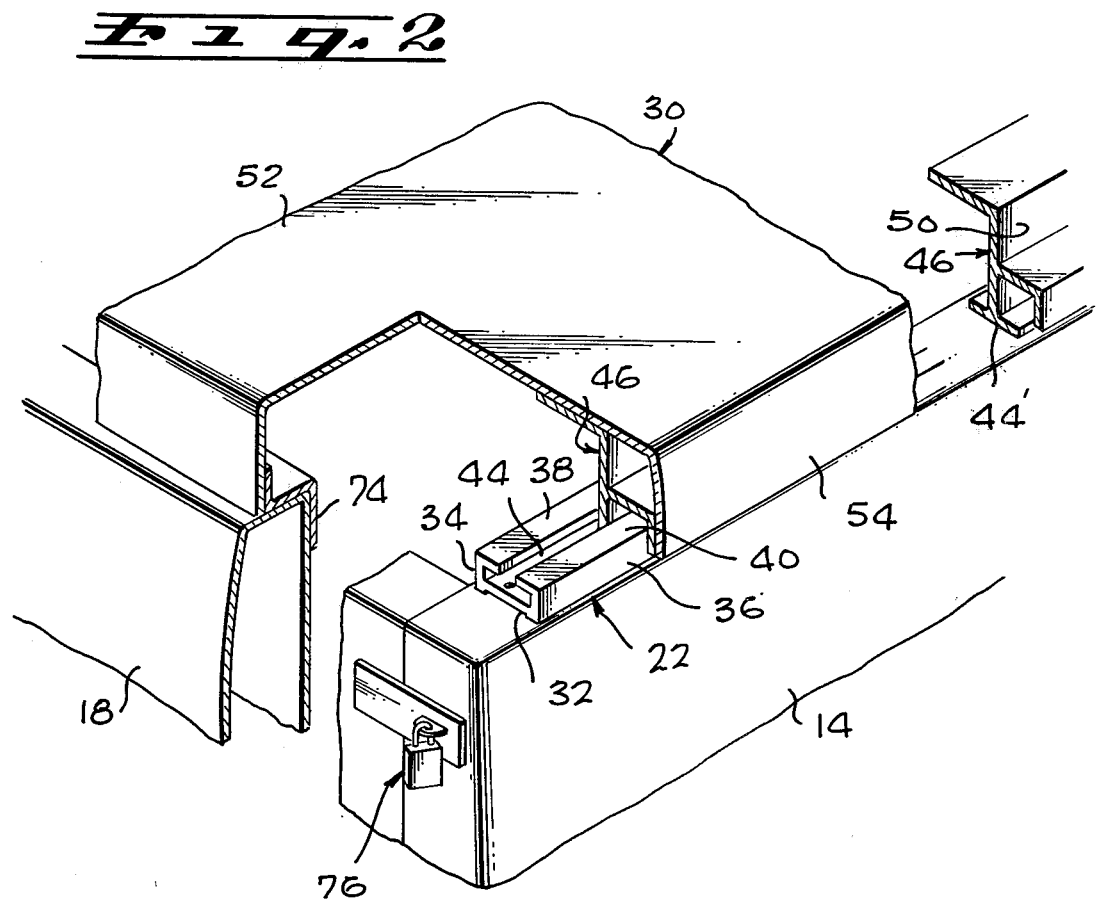

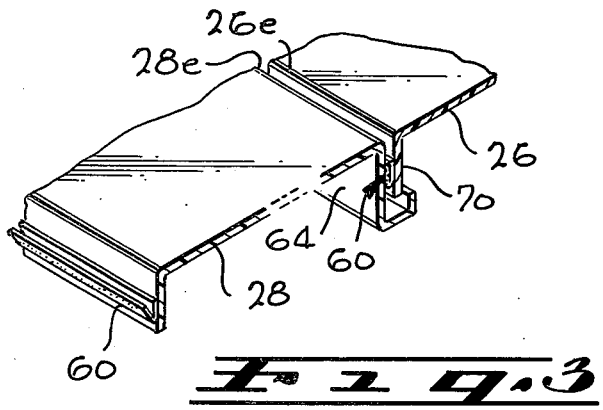
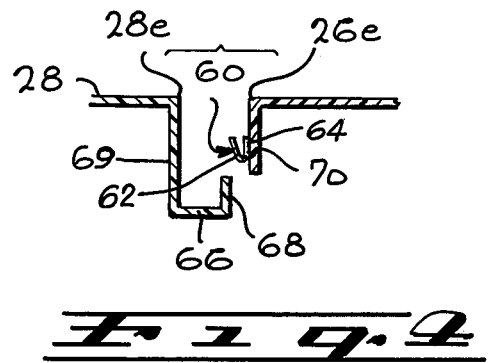
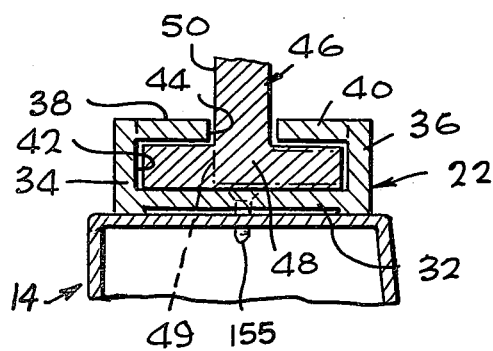
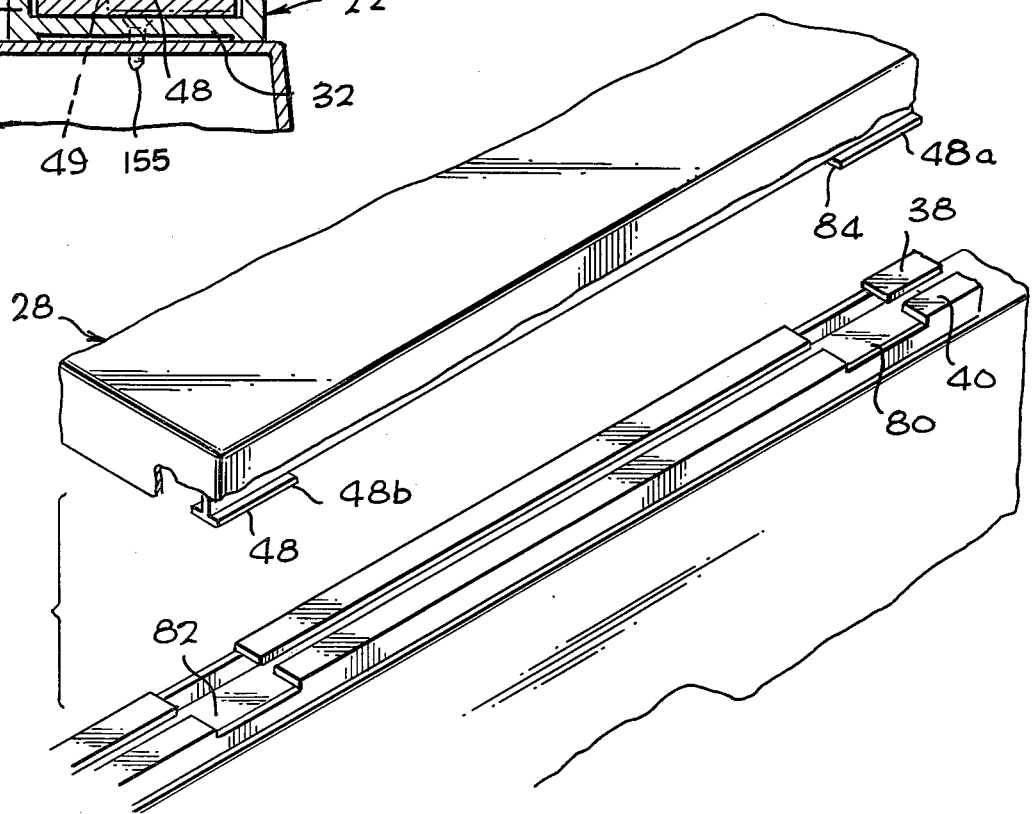

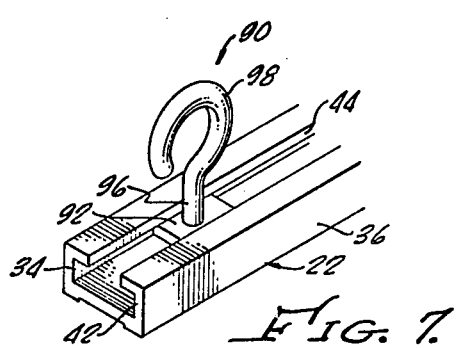
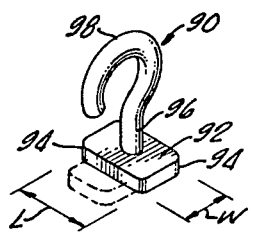
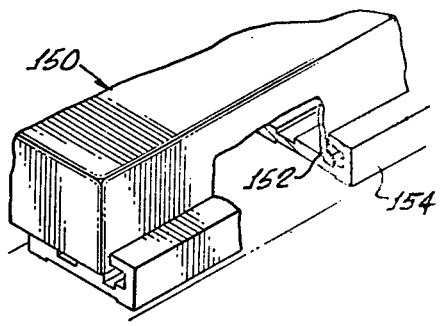
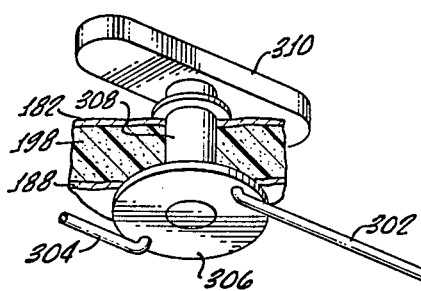
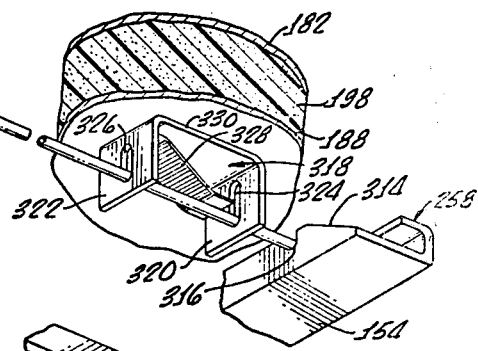
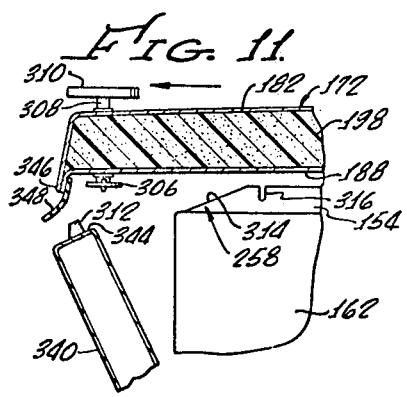
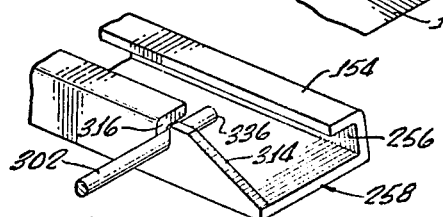

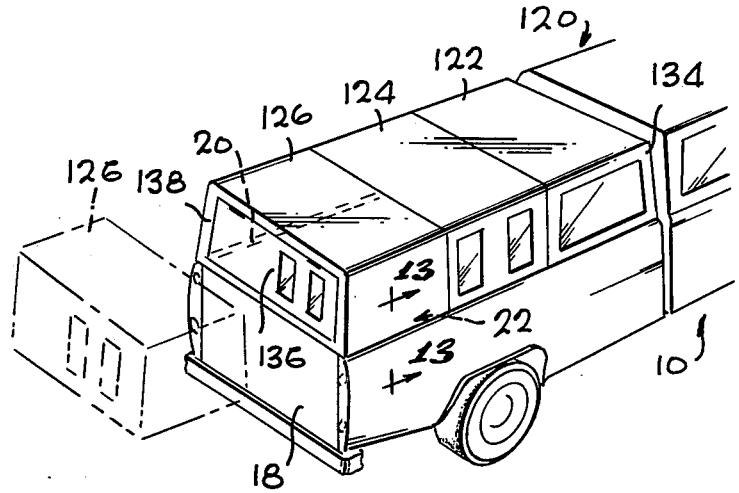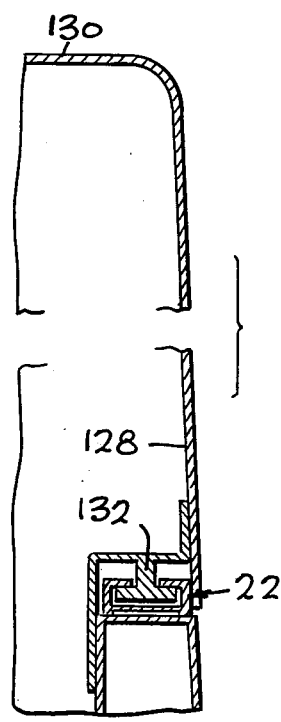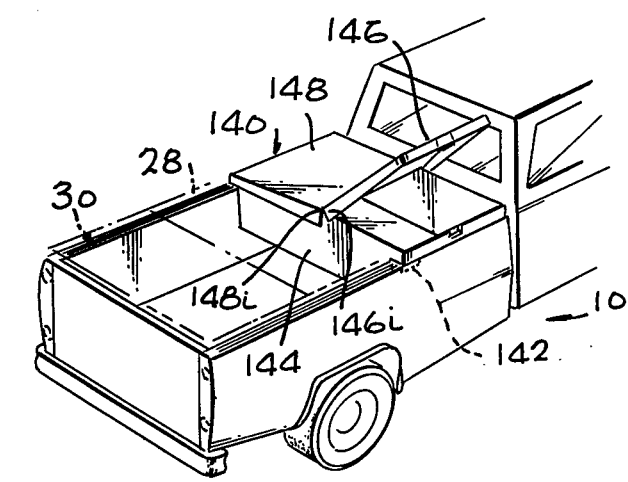

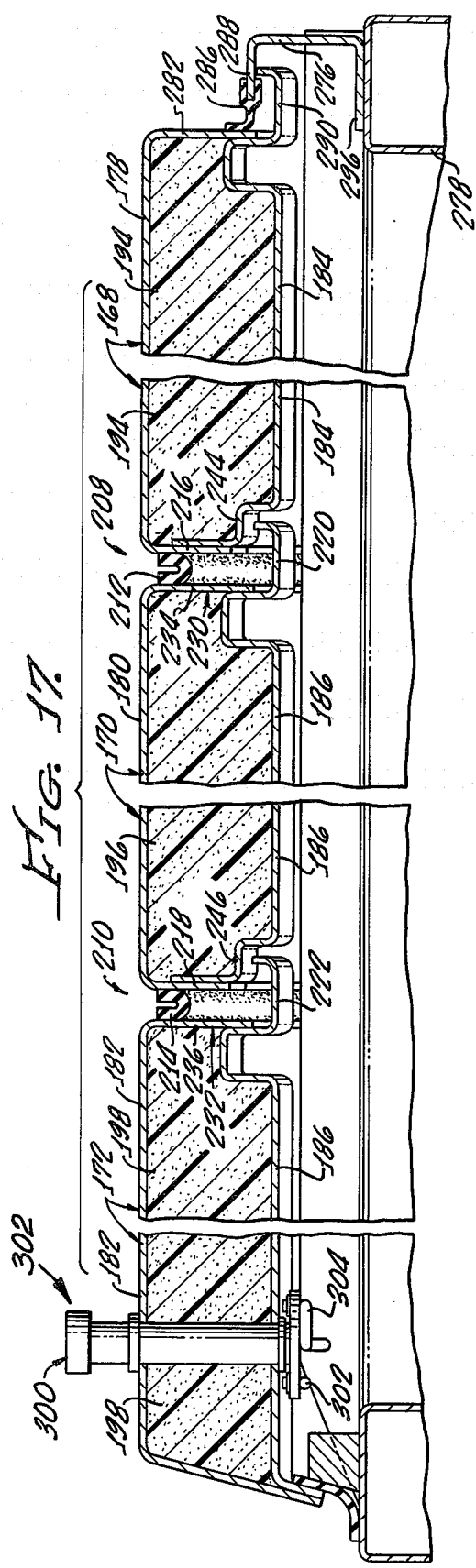
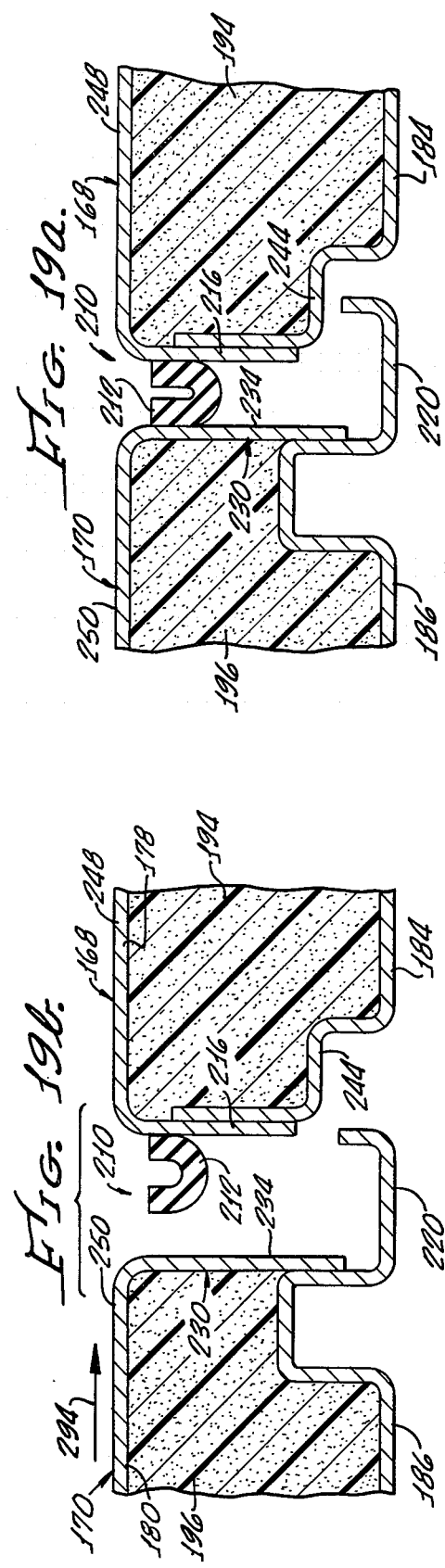

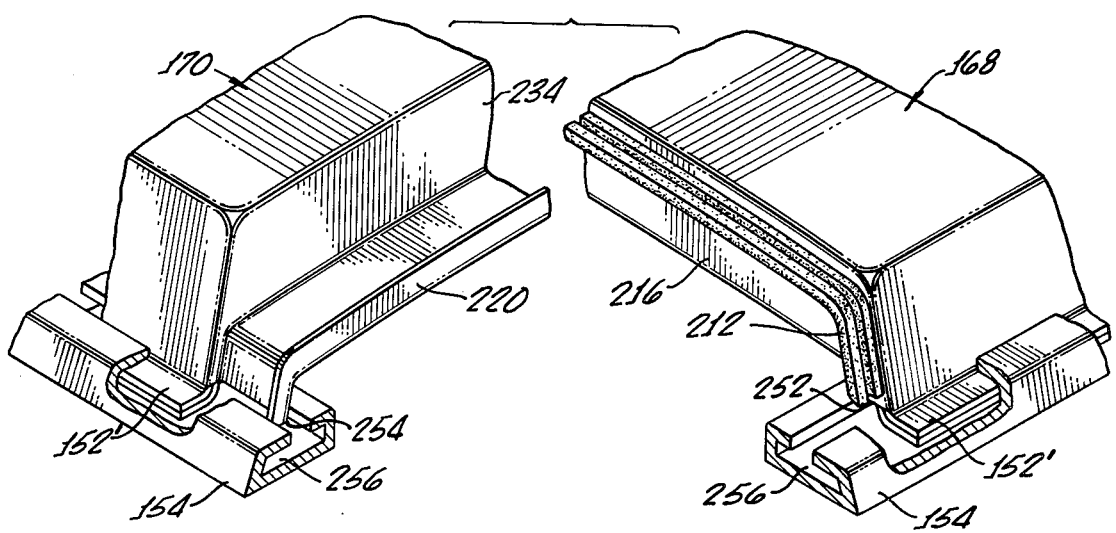
Fig. 18.
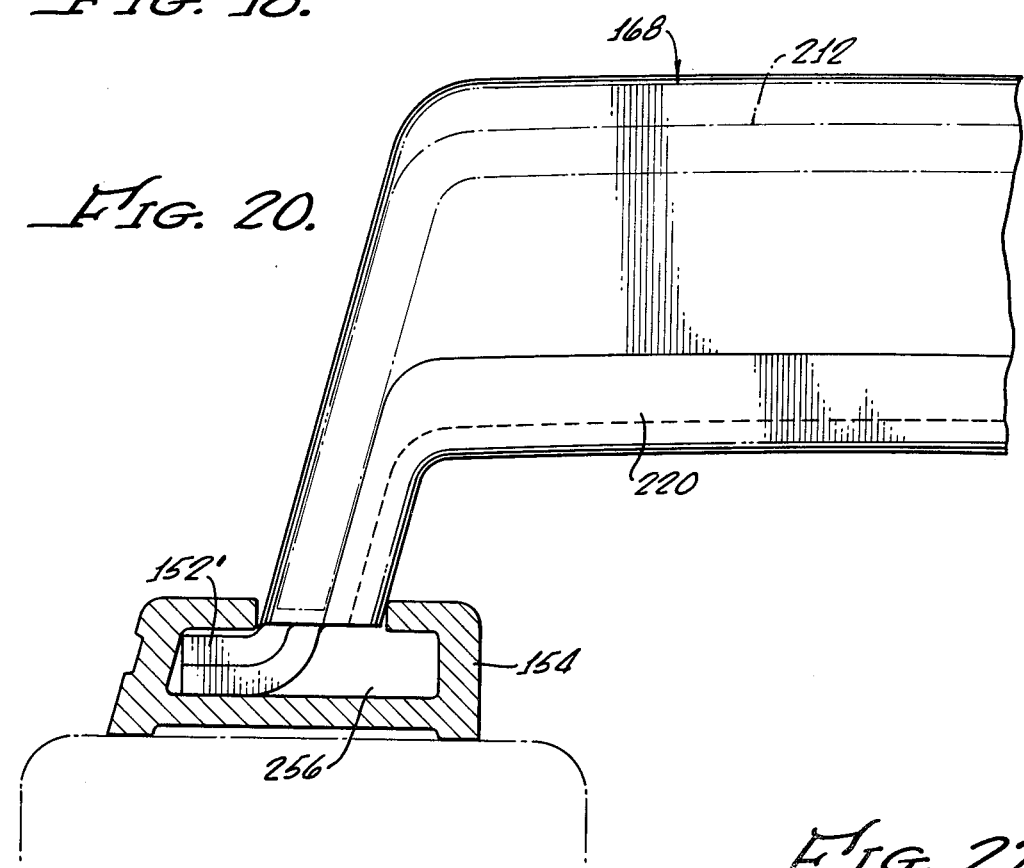
Fig. 20.
Fig. 22.
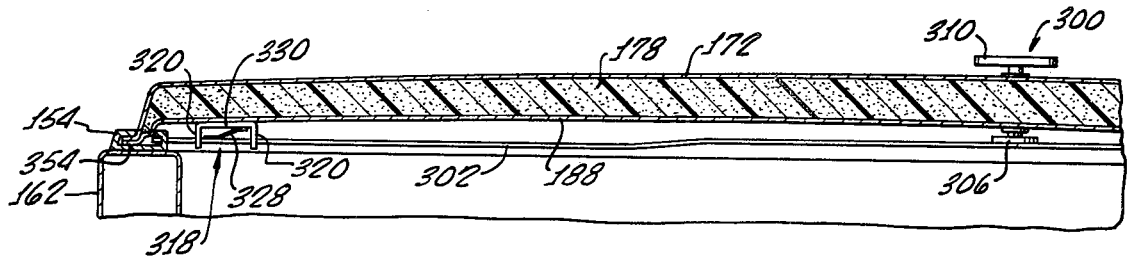

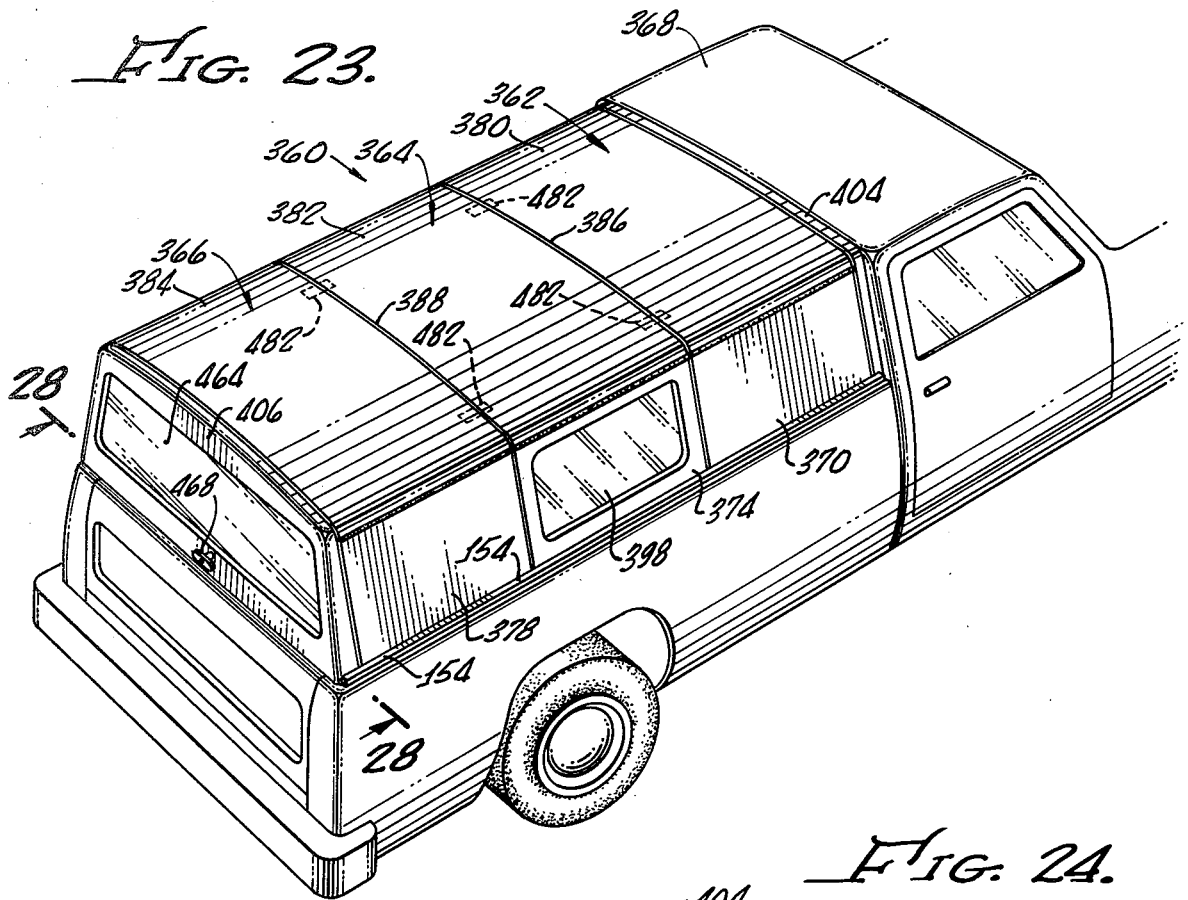
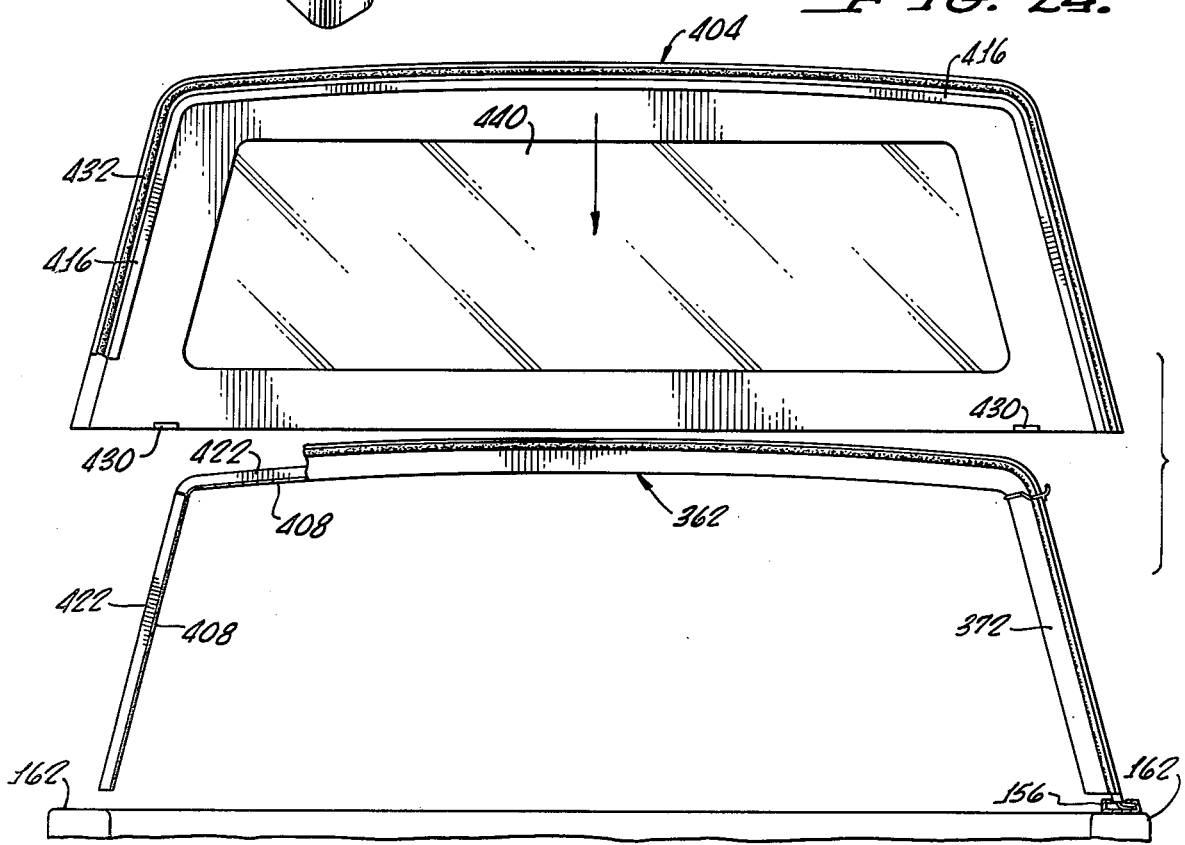

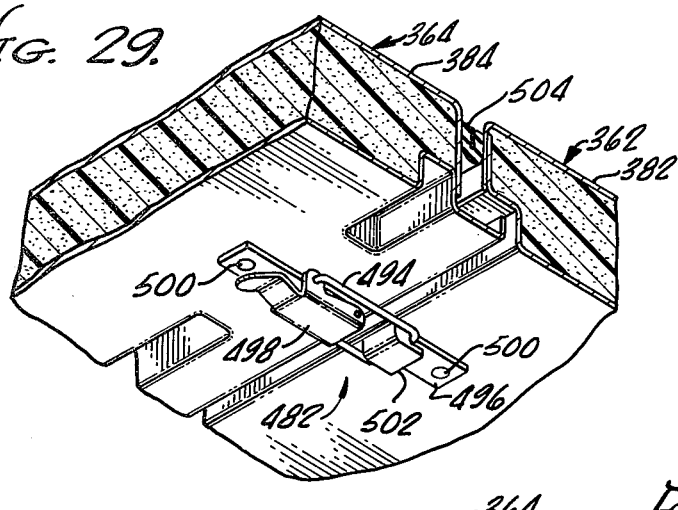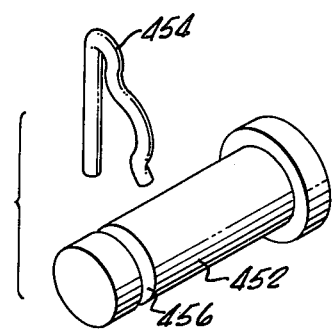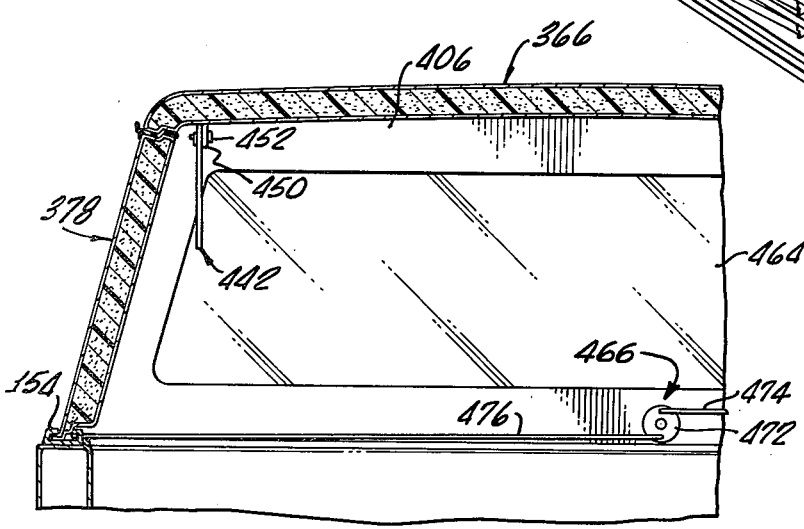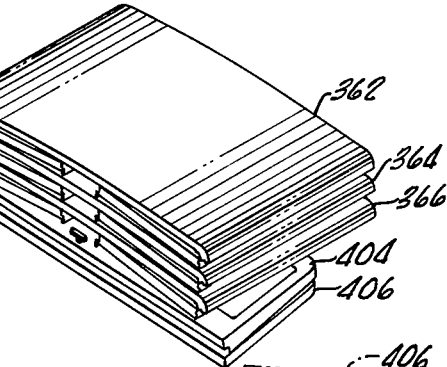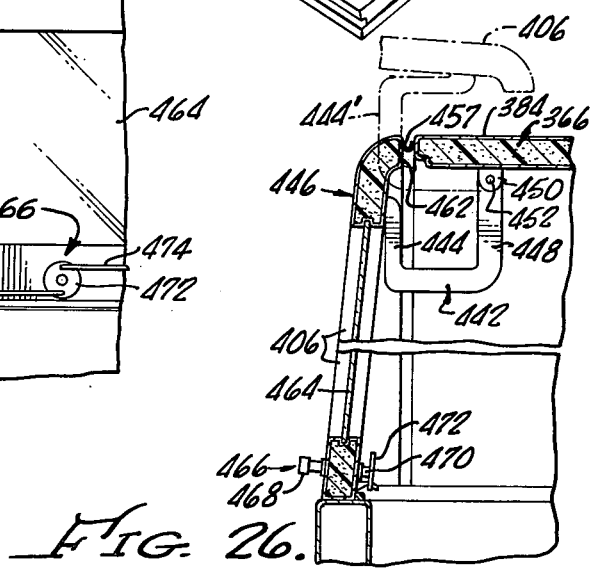

VEHICLE ACCESSORY SYSTEM

CROSS-REFERENCE

The present application is a continuation-in-part of U.S. Ser. No. 824,165 filed Aug. 12, 1977, and abandoned upon filing of the present application; U.S. Ser. No. 824,165 being a continuation of U.S. Ser. No. 603,360, filed Aug. 11, 1975, now abandoned.

BACKGROUND OF THE INVENTION

This invention relates to a vehicle accessory system.

The versatility of pickup trucks can be enhanced by providing a system for easily installing and removing accessories. A pair of rails mounted along each side of the truck bed can provide for simple mounting of any accessories. A variety of rail mounting systems have been proposed, but they either do not operate well in day-to-day operation or are difficult to install properly. For example, a T-shaped rail is shown in U.S. Pat. No. 3,773,380, which is easily mounted on top of the sidewall of a truck bed, and which is designed to receive a channel-mounting foot. However, the guiding surface of such a rail is exposed, and when ladders, pipes, and other articles are loaded onto the truck from the side, they are typically dragged over the rail, causing nicks and the like which can interfere with the reception of a channel-shaped mounting foot. Also, it is difficult to run a cable along such a rail or to provide a simple locking foot for such a rail. Other rails that have been proposed are designed to mount on the inside surface of truck bed sidewalls, where the rails are not subject to damage from equipment dragged over the sidewall. However, the distance between the inside surfaces of the sidewalls varies, due to waviness of the sheet metal, and any appreciable variation in the distance between the rails would interfere with reception of many accessories. Also, rails mounted on the inside surface of the sidewalls tend to tear the sheet metal of the sidewalls when the rails are heavily loaded, and the rails are vulnerable to damage by cargo moving in the truck bed.

SUMMARY OF THE INVENTION

A cover assembly, according to the present invention, for a truck having an open bed and a pair of sidewalls on opposite sides of the bed, comprises a pair of rails adapted to be mounted respectively on the opposite sidewalls with both rails extending longitudinally thereof and a plurality of separate cover sections configured to be slidably and removably mounted on the rails in adjoining relationship while extending across the bed. Means are mounted on the separate cover sections for forming an elastic seal compressible between adjoining separate cover sections. Included also are means for locking the separate cover sections in adjoining relationship on the rails with the elastic seals between adjoining cover sections in a compressed condition to form water resistant junctions between the sections. A composite truck bed cover is formed from the separate cover sections, each of which is constructed sufficiently small and lighweight to be easily handled and stored.

More particularly, each rail comprises a channel having a narrow slot in the top wall and which may be formed with a pair of gaps in the top wall. The separate cover sections are constructed having mounting feet adapted to be slidably received in the rails. For ease in installing and removing cover sections, at least one of the sections preferably has feet that are smaller than the rail gaps and are spaced apart in matching relationship therewith to thereby permit installation and removal of such section through the gaps without removing the remaining sections.

The cover locking means in one embodiment comprises a member disposed on the rearmost cover section adjacent the rearward edge thereof and in a position to be engaged by upright positioning of the truck's tailgate. Thus, closing and latching the tailgate in a normal manner restrains the installed cover sections on the rails.

In addition, the cover locking means may include one or more blocks narrower than the rail slot to enable insertion therethrough and having a length approximately equal to the inside width of the rail. Diagonally opposite corners of the block are preferably rounded to enable turning of the block, by an attached shank, to secure the block within the rail, and hence to lock the cover sections in place. This locking means is particularly useful if an incomplete set of cover sections are used to only partially cover the truck bed.

Comprising the sealing means are a depending flange wall disposed along the corresponding edge portion of one of each adjacent pair of cover sections and a depending trough disposed along the corresponding edge portion of the other of each such pair of cover sections. The trough is formed having a proximal upstanding wall and is of a size to accommodate the depending flange wall in underlying and overlapping relationship therewith when the pair of cover sections are in adjoining relationship. Included is an elongated elastic seal member mounted on, and extending along, one of such walls for engagement by the other of such walls when the pair of cover sections is in adjoining relationship.

The cover sections may, for example, when the sections are to function as camper shell portions, be constructed with side walls which are hingeably fixed to other portions of the sections to thereby enable, when the sections are removed from the rails, folding of the side walls for convenient storage. For some uses, the cover sections include a forward section fixed to a truck forwardly of the rails and extending across the truck bed. An adjacent removable one of the cover sections abuts the fixed section in sealing relationship.

A particular feature of the invention is that for installation purposes a cover apparatus is provided which comprises, in addition to the pairs of cover receiving rails, a plurality of truck bed cover sections configured for being slidably and removably mounted to the rails when the rails are mounted to a pickup truck bed. The cover sections include a plurality of first, interchangeable cover sections each having selected longitudinal lengths and transverse widths and a plurality of second, rearwardmost sections having the same transverse width as the first sections but having different longitudinal lengths selected to accommodate pickup truck beds having different lengths, truck pickup bed covers being thereby formed by at least one first cover section and a selected second cover section mounted to the pair of rails.

Preferably at least some of the rearwardmost sections are differently configured to match different configuration of different makes of pickup trucks. Also, the first and second sections preferably include different types of interchangeable sections whereby different cover functions may be provided for the pickup truck bed with which the cover sections are used.

When an installer is provided with kits of such sections it is generally possible to form a complete truck bed cover using several identical first cover sections and a particularly selected second section. Accordingly, large inventories of individually configured truck bed covers are not required.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of a truck constructed in accordance with one embodiment of the present invention;

FIG. 2 is a sectional perspective view of the area 2—2 of FIG. 1;

FIG. 3 is a partial perspective view taken on the line 3—3 of FIG. 1;

FIG. 4 is a sectional side view of the apparatus of FIG. 3, shown in a slightly separated condition;

FIG. 5 is a view taken on the line 5—5 of FIG. 1;

FIG. 6 is a partial perspective view of a portion of the apparatus of FIG. 1, shown in a partially diassembled condition;

FIG. 7 is a partial perspective view of the hold-down device;

FIG. 8 is a perspective view of the hold-down device of FIG. 7;

FIG. 9 is a broken-away perspective view of a portion of the locking means in the rearmost cover section;

FIG. 10 is a detailed perspective view of the end of the rail shown in engagement with a locking rod;

FIG. 11 is a side view showing operation of the lock with the truck tailgate;

FIG. 12 is a perspective view of a camper assembly constructed in accordance with another embodiment of the invention;

FIG. 13 is a view taken on the line 13—13 of FIG. 12;

FIG. 14 is a perspective view of a tool box assembly constructed in accordance with another embodiment of the invention;

FIG. 15 is a perspective view of a cover section with an L-shaped mounting foot;

FIG. 17 is an exploded cross-sectional view, taken along the line 17—17 of FIG. 16, showing the seal formed between adjoining cover sections;

FIG. 18 is a perspective view of a portion of adjoining cover sections, broken-away showing the engagement of the mounting feet and the relationship of the seal with the rails;

FIG. 19a is an enlarged cross-sectional view showing the elastic seal formed between adjoining sections;

FIG. 19b is a detailed cross-sectional view showing the adjoining sections in a separated position;

FIG. 20 is an enlarged cross-sectional view showing the engagement of the section foot with a rail;

FIG. 22 is a cross-sectional view taken along the line 22 of FIG. 16 showing a portion of the locking means;

FIG. 23 is an overall perspective of a different embodiment of a camper having sidewalls of substantial height installed on a pair of rails mounted to the truck sidewalls;

FIG. 24 is a front view of the foremost section and front panel section partially broken-away and separated to show further details used in assembly;

FIG. 26 is a detailed cross-sectional view showing the back panel section mounted to the rearmost section by a detachable hinge;

FIG. 26a is a detailed cross-sectional view similar to that of FIG. 26, showing a variation thereof FIG. 27 is an enlarged perspective view of the detachable hinge pin;

FIG. 28 is a partial cross-sectional view, taken along the line 28—28 of FIG. 23 showing the lock in the rear panel;

FIG. 29 is a perspective view of a latch for holding a pair of sections in their proper adjoining relationship;

FIG. 30 is a cross-sectional view of a section showing a sidewall in a folded position beneath the section top;

FIG. 31 is an overall perspective view of a cover assembly folded to a relatively flat configuration for storage.

DESCRIPTION OF THE PREFERRED EMBODIMENT

Figure 16:
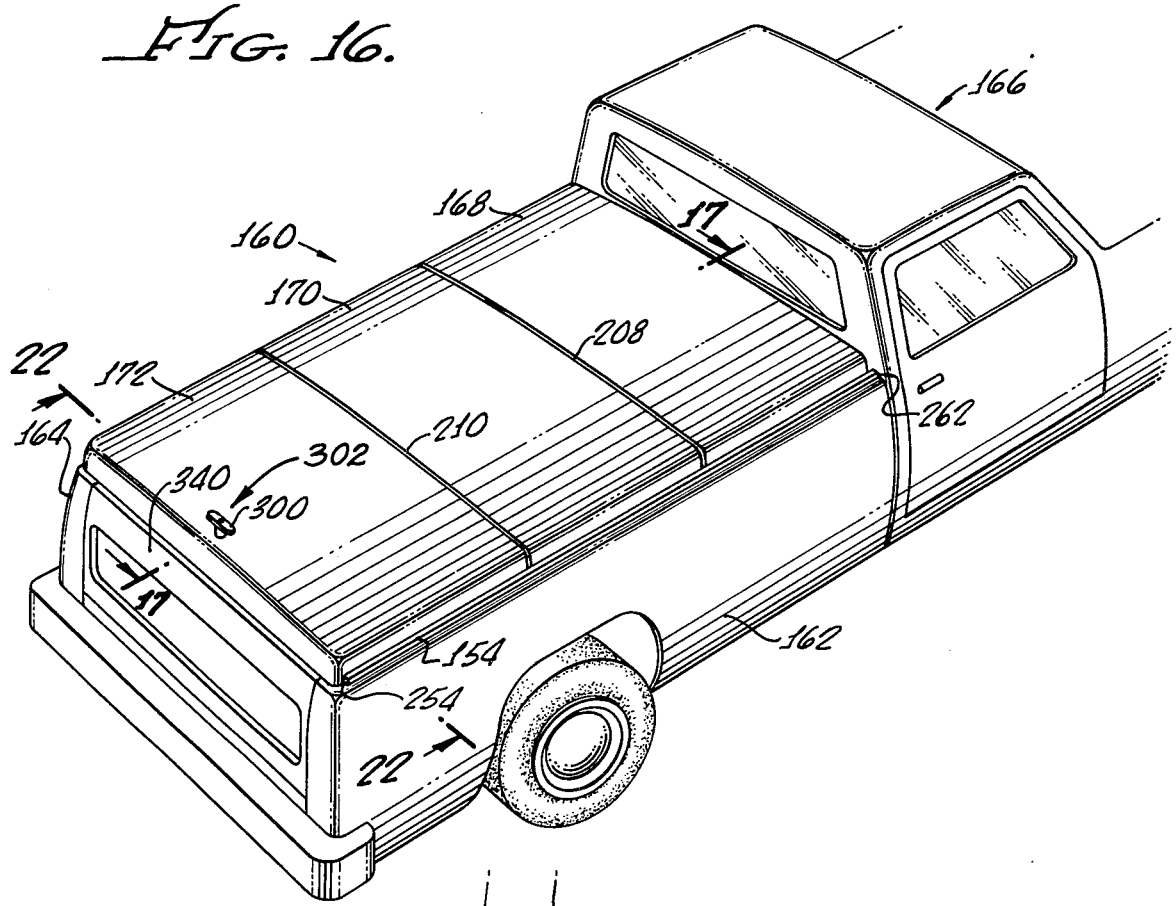
FIG. 16 is an overall perspective view of a cover assembly utilizing a substantially L-shaped mounting foot installed on a pair of rails fixed to the sidewalls of a pickup truck.

FIG. 1 illustrates a pickup truck 10 which has an open truck bed with a pair of sidewalls 12, 14, a front wall 16, and a tailgate 18. In accordance with the present invention, a pair of rails 20, 22 are mounted on top of each sidewall 12, 14 to provide a holding means for a cover assembly 24 that covers the truck bed to permit the storage of goods in the truck while protecting them from theft and the elements, particularly rain. The cover assembly 24 includes three enclosing or cover sections 26, 28, 30 that together enclose the entire truck bed, with each section extending completely across the width of the bed and extending approximately one-third the length of the bed. The length of each section is less than the width of the truck bed, so that when one or more of the cover sections are not being utilized to cover the truck, the cover section can be stored within the truck bed.

As also shown in FIG. 5, each rail such as 22 includes a bottom wall 32 which rests on the top of the truck sidewall 14, a pair of upstanding rail sidewalls 34, 36, and a pair of rail topwalls 38, 40 that extend towards one another but with a gap between them. This forms an enclosed channel 42 with a slot 44 narrower than the channel extending along the top of the channel. Each cover section has a pair of mounting feet 46. Each foot 46 has a block portion 48 slightly narrower than the channel 42 but wider than the slot 44, and a shank portion 50 which extends upwardly from the block portion and which supports the rest of the cover section. The block portion can be formed as a T as shown at 48, or may be formed as an L as indicated in phantom lines at 49. As shown in FIG. 2, the cover section includes a protective sheet 52 that extends across the width of the truck bed, and which has depending sides 54 that extend beyond the rail slot 44 and to a level substantially no higher than the top of the rail. The depending sheet portions 54 serve as a barrier that keeps out most of the rain that might fall on or be blown against the vehicle, to protect articles in the truck bed. Any small amount of rain that passes under the sheet portion 54 is stopped by the mounting foot 46 and merely drops into the channel 42 where the rain is drained from an end of the channel.

The adjacent edges of the cover sections, at the rear edges of the two forward cover sections 26 and 28, are sealed against the passage of water, by the construction best illustrated in FIGS. 3 and 4. An elastomeric sealing strip or seal 60 is attached to one end portion 26e of a section and contacts the adjacent end 28e of another cover section 28 when the cover sections are fully installed on the vehicle. The elastomeric seal 60 has a pair of strip-like portions 62, 64 which are foldably joined at their lower edges, the two strip-like portions tending to pivot apart at their top so that the free portion 62 contacts the other cover section 28. Even if there is a slight separation between the cover sections, the seal acts as a trough which carries rain to the side of the truck where it is allowed to fall onto the street. The front end 28e of the cover section 28 is formed to provide a trough 66 with an extreme upstanding endwall 68 which extends to a small height lower than an opposite wall 69 of the trough, while the adjacent cover section 26 is formed with a downwardly extending flange wall 70 that lies over the trough 66. Thus, any rain leaking past the seal 60 is nevertheless captured in the trough 66 so that the rain does not fall directly onto the goods in the truck bed.

The cover assembly 24 must be guarded against unauthorized removal of the cover sections, to prevent theft of equipment in the truck bed or even of the cover sections themselves. As shown in FIGS. 1 and 2, a simple locking device is provided by means of flanges 74 that are attached to the rear end of the rearmost cover section 30. The flanges 74 extend down to a level so they lie below the top of the tailgate 18 when the tailgate is swung up to a closed position. The tailgate is provided with a locking device 76 to enable it to be locked in an up position. When all three cover sections 26-30 have been installed and the tailgate 18 is locked in its closed position, none of the cover sections can be removed, and therefore no equipment in the truck bed can be removed.

It is often desirable to permit removal of the foremost cover section 26 without requiring complete removal of the other cover sections 28, 30 as when the operator wishes to gain access to equipment stored near the front of the truck bed. FIG. 6 illustrates details of one of the rear mounting feet 46a of the foremost cover section 26, and details of the rail 22 which facilitates removal of the cover section. The rail 22 is formed with longitudinally spaced gaps 80, 82 in its topwalls 38, 40. The mounting foot 46a of the cover section is formed with a gap 84 along either side of its block portion 48, to leave two longitudinally spaced full block portions 48a, 48b. The spacing of the middle of the block portions 48a, 48b is approximately the same as the spacing of the middle of the rail gaps 80, 82. Thus, the front cover section 26 can be removed by sliding the two other cover sections 28, 30 rearwardly a small amount such as six inches, until the mounting foot portions 48a, 48b are aligned with the corresponding gaps in the rails, so that the front cover section can be lifted off the rails. Only a small amount of rearward sliding of the cover sections 28, 30 is required, so that neither section has to be taken off the vehicle, and therefore the procedure can be executed with relatively small effort. It may be noted that the mounting foot at the opposite side of the cover section 26 and the forward portion of the other rail 20 are similarly constructed with cutouts.

When the vehicle is to be used with only the front cover section 26 removed, as when carrying a tall plant at the front of the truck bed, it is desirable to provide means for preventing forward sliding of the other cover sections 28, 30. FIGS. 7 and 8 illustrate a mount member 90 of simple construction with no moving parts, which can be easily installed on the rail 22 and locked into position therealong. The mount member includes a block 92 designed to fit within the rail channel 42 and having a block length L long enough to provide a slight interference fit with the inner surfaces of the sidewalls 34, 36 of the rail. The block 92 is also provided with rounded corners 94 so that the block can be turned while lying within the rail channel. A shank 96 with a lower end threadably coupled to the block 92, extends upwardly from the block and has an upper end formed into a rigid loop portion 98. The mount member 90 can be inserted into the rail channel 42 with the shank 96 extending through the slot in the channel, until the mount member is at the desired position along the rail. An operator grasps the loop portion 98 of the shank and turns the mount member so that the ends of the block 92 press against the sides of the channel to lock the block in place along the rail. The loop portion 98 of the shank enables the mount member to be used even when the cover assembly 24 is not being utilized, the loop portion 98 seving to receive ropes for holding down cargo in the truck bed. Although the mount member 90 can be readily installed even when there are no cutouts in the rail, by merely inserting the block 94 at one open end of the rail, insertion is facilitated by constructing the block so that its width W is slightly less than the width of the slot 44 in the rail. Thus, an operator can install the mount member at any location along a rail by merely passing the block down through the rail slot and then turning the mount member 90°.

FIGS. 12 and 13 illustrate a camper assembly 120 designed for simple installation and removal on a pickup truck 10 by installation on the rails 20, 22. The camper assembly includes three enclosing sections 122, 124, 126 which extend the length of the truck bed to enclose it while providing room for free movement of people therein. Each of the camper sections has a pair of upstanding largely vertical sidewalls 128 (FIG. 13) extending about three feet above their bottom so that a man can readily walk within the truck bed, and having a top wall 130 connecting the top of the sidewalls. The bottom of each sidewall 128 is mounted by a mounting foot 132 on a corresponding rails such as 22. Of course, the forward section 122 of the camper assembly has a forward wall 134 while the rearward section has a rearward wall 136, so that there is an enclosed area for people to inhabit. The division of the camper assembly 120 into three sections, and the fact that each of the three sections can be easily installed by merely sliding its mounting feet in the rails, means that one person can install or remove the camping assembly from a truck. The front and rear sections 122, 126 can be constructed with a weight such as seventy-five pounds while the middle section 124 can be readily constructed with a weight such as thirty pounds, so that each section can be lifted by a person. The rearward section 126 is provided with a swing-up hatch 138 to facilitate movement into and out of the truck bed. A person can use only the front and rear camper sections 122, 126, so that there is room for another section, such as a section for holding a dog or a tool box section.

FIG. 14 illustrates a tool box enclosing section 140 that can be installed in place of one of the sections 26 of the cover assembly 24. The tool box section 140 has a pair of mounting feet 142 that mount on the rails, and has a box 144 with side and end walls extending below the level of the mounting feet and with a bottom wall joined to the side and end walls. A pair of covers 146, 148 on opposite sides of the box have inner edges 146*i* and 148*i* pivotally mounted about longitudinally-extending axes near the middle of the box, so that a person can gain access to either side of the tool box by opening one of the covers.

FIG. 15 illustrates a cover section 150 which has an L-shaped mounting foot 152 in a rail 154, that simplifies construction and which also is effective in keeping out rain.

The rails 20, 22 utilized to mount various accessories on a vehicle, are aluminum extruded members, and they can be easily installed on the top of a sidewall of a vehicle by flat head sheet metal screws of the type illustrated at 155 in FIG. 5, or by other fasteners. Once a pair of rails are installed, they permit the rapid installation of a wide variety of other accessories. In day-to-day use of pickup trucks with their beds uncovered, heavy equipment is often loaded on the trucks by dragging them over the rails 20, 22. This can cause nicks and distortion in the outer surface of the rails, inasmuch as the aluminum of which the rails are made in softer than the steel in many pieces of equipment. However, such nicks do not prevent smooth installation of accessories on the rails inasmuch as the walls of the channel along which mounting feet of the accessories move, is protected.

Figure 21:
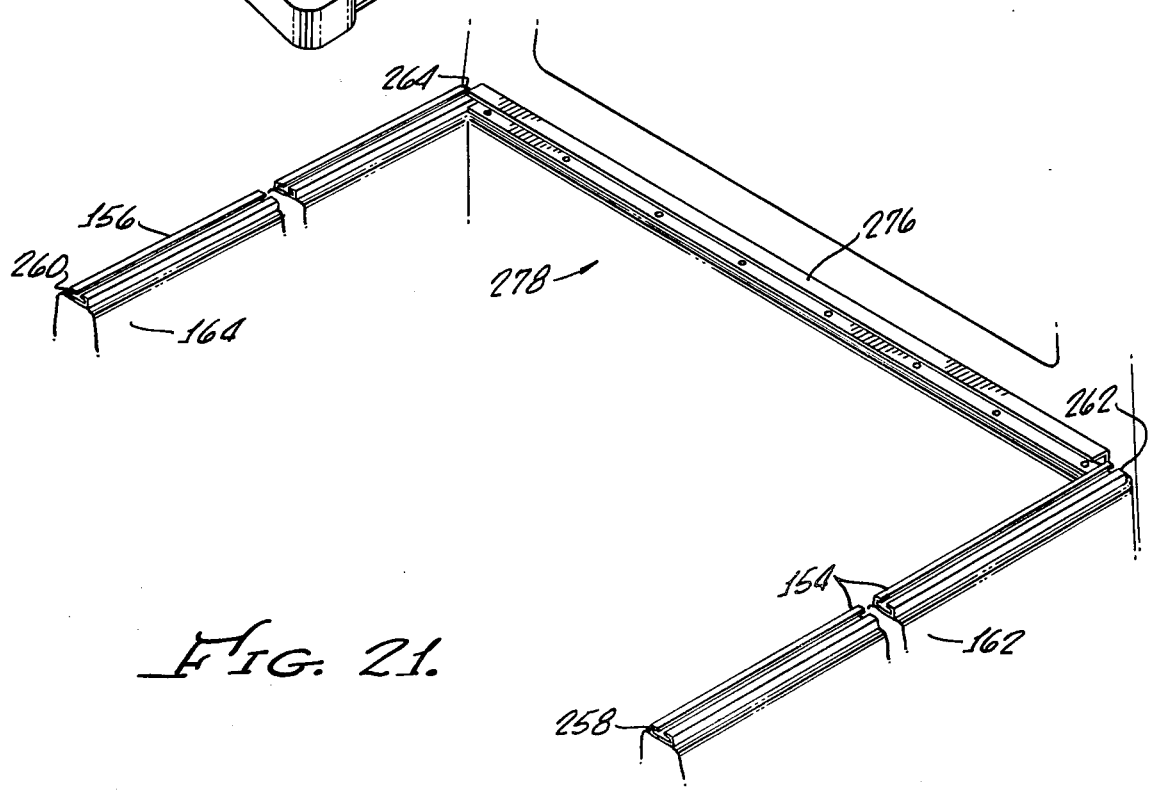
FIG. 21 is a perspective view showing a channel mounted to the front wall of a truck and adapted to engage the front edge of the foremost section.

An overall perspective view of a cover assembly 160 utilizing an L-shaped mounting foot substantially as shown at 152 (FIG. 15) but better seen at 152' in FIG. 18 dipicted in FIG. 16 installed on the rails 154, 156 (FIG. 21) which are mounted to the sidewalls 162, 164 of a pickup truck 166 (FIG. 16).

The cover assembly 160 includes a plurality of cover sections 168, 170 and 172 which may be of equal length (measured longitudinally of the vehicle); however, it is important that different truck bed lengths can be accommodated by changing the length of only one section, preferably, the rearmost section 172. In other words, all make trucks having the same distance between their sidewalls could use the common sections 168, 170 and all modifications to accommodate the different length and styling of various pickup trucks can be accomplished by changing only the length and style of the rearmost section 172. This is a significant manufacturing feature since a single large mold, such as required by a one piece cover, need not be changed for each style of truck on the market; only the rearmost section mold need be changed.

Additionally, this design feature reduces inventory bulk, since a complete cover assembly, one for each type of pickup truck on the market, does not have to be stocked.

To achieve strength and rigidity, each section as seen in FIG. 17 is constructed with molded top shell pieces 178, 180, 182 joined to bottom shell pieces 184, 186, 188 with plastic foamlike material 194, 196, 198 disposed therebetween.

The modular or sectional features of this invention are enabled by the elastic and complient seals such as 208 and 210 between the cover sections 168, 170, 172. These seals function to prevent moisture from entering the enclosed truck bed while at the same time being complient to accommodate some bending or twisting of the sidewalls 162, 164 during truck operation. In addition, the seals 208 and 210 tend to maintain proper spacing between each and all of the sections 168, 170 and 172, plus act as sound deadners to prevent or reduce rattling between the sections. Vibration generated by truck operation tends to space the sections uniformly thereby equalizing the elastic or seal loading.

The seals 208 and 210, shown in detail in FIG. 17, include U-shaped elastomer strips 212 and 214, preferably respectively disposed on depending walls 216 and 218 on each of the sections 168 and 170 and depending troughs 220 and 222 disposed along edge portions 230 and 232, which lie in an underlying and overlapping relationship with the depending walls 216 218. Each of the troughs 220, 222 has a proximal wall respectively 234 and 236 for engaging the elastic strips or members 212, 214 when the sections reside in adjoining relationship. A perspective view of the strip 212 and the trough 220 is shown in FIG. 18, which is discussed further hereinafter.

During truck operation, the sections 168, 170, 172 (FIGS. 16, 17) will flex, causing slight relative motion between the elastic members 212, 214 and the proximal walls 234, 236; however, any moisture which may creep past the U-shaped elastic members is caught by the troughs 220, 222 and thereby prevented from entering the enclosed truck bed. It is preferable that the elastic strips 212, 214 are sealed to the depending walls 216, 218 in a watertight manner in order to prevent any moisture from creeping past the strips and the depending walls and thereafter entering the enclosed bed by creeping past the trough along the inside edge surfaces 244, 246.

The seals 208, 210 also function to catch, in a gutter-like fashion, water standing on the section top surfaces 248, 250 which may otherwise drop into the truck bed when the sections are pulled apart for removal. This can be more clearly seen in FIG. 19*b*, where the sections 168, 170 are shown slightly separated.

Because the elastic U-shaped member 212 is attached to the depending wall 216, any water present on the top surface 248 will be collected by the U-shaped member 212. Similarly, water left standing on the top surface 250 will be collected by the trough 220.

As best shown in FIGS. 18 and 20, an elastic member end portion 252 and trough end portion 254 both lie adjacent a longitudinal channel 256, formed in the rail 154. Hence, water collected by the elastic member 212 and trough 220 is conducted externally of the enclosed truck bed via the channel 256.

Returning to FIGS. 19*a* and 19*b*, it is evident that the movement of the section 170 toward section 168, shown by the arrow 294, partially compresses the U-shaped member 212. When compressed, the U-shaped members 212, 214 (FIG. 17) maintain proper spacing between each and all of the depending walls 216, 218 and the troughs 220, 222, so as to insure an overlapping and underlying relationship therebetween.

It is preferable that sections 168 and 170 are not individually locked to the rails because the U-shaped elastic members 212, 214 can act as positioning elements for the sections. Stated in another way, the elastic members 212, 214 may act in conjunction with one another to promote even or equalized spacing between the sections 168, 170 and 172 as the sections are agitated during truck operation. Even spacing between the sections assures an underlying and overlapping relationship between each trough 220, 222 and corresponding depending walls 216, 218, because the sections are locked together with the U-shaped members, such as 212 each under some compression. The compressive force is established by squeezing the sections together and maintaining the squeezed configuration through firmly connecting the configuration to the fixed, spaced apart, positions supported by the rigid truck body.

The foremost section 168 in FIG. 17 engages an abutment channel 276 mounted to an upstanding truck front wall 278 to form a waterproof seal therebetween. A front edge 282 of section 168 engages an elastic member 286 disposed on a channel upper edge 288 to form a water resistant seal and the foremost section trough 290 overlaps and underlies this junction to catch water if it passes by the elastic member 286.

The sections 168, 170 and 172 are preferably slightly bowed, i.e., slightly higher at the center than near the rails, (see FIG. 22) to reduce puddling of water on top of the sections. To accommodate this bowed shape, the channel 276 has sufficient height between its upper edge 288 and lower edge 296 to receive the trough 290 at both the center of the section 168 and near the rails 154, 156.

The sections 168, 170 and 172 are held in an adjoining relationship at the rear end, as shown in FIGS. 16 and 17, by an operative portion 300 of locking means 302 disposed in the rearmost section 172. The locking means includes a pair of moveable extender means or rods 302, 304 (FIGS. 9 and 22) connected near the periphery of a disk 306 which is fixed to a shaft 308 extending through the section 172. The shaft in turn, is attached to a handle 310 housing a key mechanism, not shown.

The rod 302 engages a ramp 314 (FIGS. 9 and 10) and notch 316 cut into the rail end 258, when the rearmost cover section 172 is slid forward on the rails 154, 156 to a position compressing the U-shaped elastic members. In a corresponding fashion to other rod 304 also engages the opposite rail 156. The rod 302 is held by a rod guide 318 having two depending legs 320, 322 each having respective slots 324, 326 through which the rod passes. This is shown most clearly in FIG. 9 which is an exploded broken away view of a portion of the lock mechanism looking at the underside of the rearmost section 172. The rod 302 is urged toward the bottom of the slots 324, 326 by a spring member 328 attached to the rod guide top 330.

In operation, the lock handle 310 is rotated to extend the rods 302, 304 outwardly toward the rails 154, 156 with the rod end 336 extending into the rail channel 256. The sections then can be locked in their adjoining relationship on the rails by simply pushing the rearmost section forward to position all the sections in their adjoining relationship with the elastic members 212, 214 slightly compressed and the troughs 220 and 222 in underlying and overlapping relationships with the depending walls 216, 218.

It should be evident that unlocking the section is accomplished by rotating the handle 310 in the opposite direction and thereby extracting the rods 302, 304 from the slots and allowing the rearmost section to be pulled rearward on the rails 154, 156.

To secure the truck tailgate 340 (FIG. 11) in addition to the cover assembly 160, the locking means includes a fixed member 342 attached to the tailgate top 344 in a position to be engaged by a depending inside wall 346 of the rearmost section 172. An elastomeric skirt 348 is attached to the depending wall 346 in a position to overlap the fixed member 342 to prevent water, dirt or moisture from entering the enclosed truck bed. FIG. 11 shows the unlocked rearmost section 172 in a position enabling the downward movement of the tailgate 340. Because the rearmost section feet such as foot 354 (FIG. 22) engage the rails 154, 156 along the entire length of the section, it can be slid rearward allowing the opening of the tailgate, without complete removal of the rearmost section from the rails 154, 156, or without additional support to hold the rearmost section in its extended position from the back of the truck.

Thus, it may be appreciated that the anchoring positions on truck 166 for maintaining the locked compression of the section seals are the forward channel 276 and the truck supported rails 154 and 156 at the notches, such as 316. In FIG. 1 these positions include the tailgate 18 and cab of truck 10. Both of these arrangements permit articulation of the cover sections while maintaining a watertight enclosure.

FIG. 23 illustrates a cover or camper assembly 360 having a foremost section 362, a center section 364 and a rearmost section 366 installed on the pickup truck 166, as hereinbefore described. To enable a person to easily move about beneath the camper assembly, the section sidewalls such as, 370, 374 and 378 are of substantial height.

The elastic seals 386, 388 formed between the sections 362, 364 and 366 extend along the section top portions 380, 382 and 384, as well as along and between the sidewalls 370, 374 and 378 to prevent moisture penetrating into the truck bed and additionally to conduct any collected water to the rails 154, 156.

To provide visability, any sidewall may be fitted with a window 398, as shown in the midsection sidewall 374.

To provide complete enclosure of the truck bed and lock the assembly 360, it includes front and rear panel sections 404, 406 removably attached to the foremost and rearmost section, 362, 366 respectively.

Figure 25:
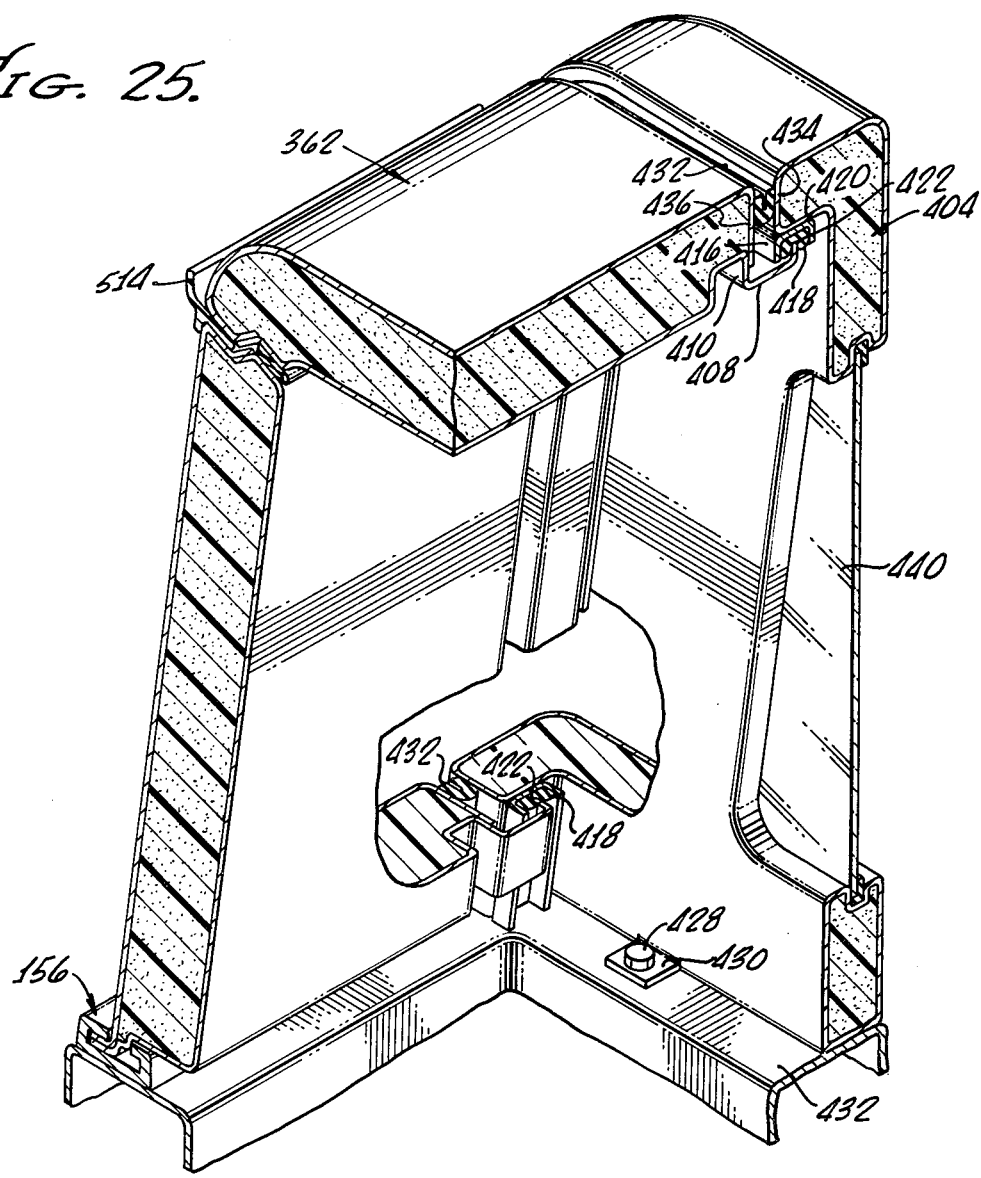
FIG. 25 is a perspective view of a corner portion of the foremost section and front panel section, partially broken-away to show the engagement relationship therebetween.

The trough 408 (FIGS. 24 and 25), disposed along the front edge of the foremost cover section 362, provides a dual function in forming a complient seal between the panel section 404 and the section 362 and locking the front panel section 404 to the foremost section 362. The front panel section 404 is installed (after section 362 is in place) between the upright sidewalls 370, 372 by sliding the front panel section downward onto the trough 408. A channel 416 with an elastomeric strip 418 therein is mounted to an inside portion 420 of the front panel 404 and engages the upstanding lip 422 of the trough 408 to form a water-tight-rattle-resistant seal therebetween. The front panel 404 is held in this position by a set of bolts 428 passing through panel mounting flanges 430 attached to the truck front wall 432.

A U-shaped elastomeric strip 432 is disposed along the front panel section rearward edge 434 which engages a forward edge 436 of the foremost section 362 to form a water resistant seal therebetween. As previously discussed, water which may seep past the U-shaped strip 432 is collected by the trough 408 and channeled to the rails 154, 156.

The front panel section 404 (FIG. 26) is preferably constructed with a window 440 therein which is in alignment with a truck cab window, not shown.

To provide easy access to the cover assembly 360, the rear panel section 406 (FIG. 26) is attached to the rearmost section 366 by means of a pair of readily detachable U-shaped hinges 442.

One hinge arm 44 is fixed to the rear panel section 406 proximate a top portion 446 thereof and the other hinge arm 448 is pivotally mounted to a depending flange 450 on the underside of the rearmost section top portion 384 by a removable hinge pin 452. To provide a simple means to remove the hinge pin 452, a spring clip 454 (FIG. 27) may be formed to fit a circumferential groove 456 cut into the hinge pin 452.

A U-shaped elastomeric strip 457 (FIG. 26) is disposed along the rear panel section inside edge 462 in a position to engage both the top portion 384 and the sidewalls of the rearmost section 366 when the rear panel is in a closed position thereby preventing water leakage.

In order to catch moisture which may seep past the seal 457, the rearmost cover section 366' may be modified, as shown in FIG. 26a, by cementing a trough 458 along the rear edge thereof. A depending wall 460 may be disposed along the edge of the rear panel section 446' and sized so that when the rear panel section 446' is closed, the trough 458 resides in an underlying and overlapping relationship therewith. In this modification, the U-shaped elastomeric strip 457 is disposed along the depending wall 460.

The rear panel section 406 is preferably constructed with a window 464 therein to provide visability for the truck driver.

Similar to the previously described locking means 302, a key lock 446, (FIGS. 26 and 28) consisting of a handle 468, shaft 470, disc 472 and rods 474, 476, operates to engage the rails 154, 156 in order to lock the sections 362, 364, 366 on the rails via sections 404 and 406 and form complient elastic seals 386, 388 between the sections.

In addition, to ensure that the sections remain in their adjoining positions with the elastic member in a partially compressed state, as hereinbefore shown in FIG. 17, it is preferable to use additional mating latches 482 disposed on the undersides of the section tops 380, 382, 384. See FIGS. 23 and 29. As best seen in FIG. 29, each latch 482 may be of conventional design having a hoop 494, a hook 496 and a lever clamp portion 498. The clamp 498 and hook 496 are fixed to the undersides of the top portion 382, 384 by screws 500, or the like, in an adjacent mating relationship. In order to permit the seal to remain complient, to accommodate warping or twisting action of the truck 368, the hoop 494 and the curved portion 502 of the hook 496 are sized to that when the latch 482 is in a closed position, as shown in FIG. 29, the section 382, 384 can move together slightly without the hoop 494 falling out of the hook 496.

As hereinbefore discussed, in connection with the camper assembly shown in FIG. 12, each of the section in the camper embodiment of FIG. 23 are sized to permit removal and installation by a single man. An additional important feature of the camper assembly 360 resides in the collapsibility of each section when it is removed from the truck body. As shown in FIG. 30, the sidewalls are preferably attached to the top by means of hinges 510 which allow the sidewalls to be folded inwardly beneath the top portion of the section and to a relatively flat configuration to facilitate compact storage of the camper sections when they are not in use. When folded to a relatively flat configuration the sections 362, 364, 366 and panel sections 404, 406 may be stacked upon one another, as shown in FIG. 31, thus occupying a minimum of floor space.

Figure 32:
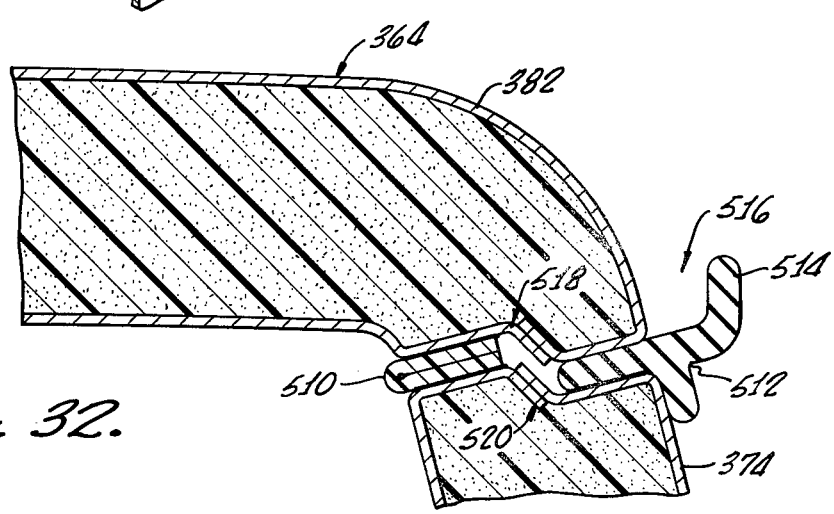
FIG. 32 is an enlarged cross-sectional view of the hinge operative between the top of a section and the sidewall of a section to fold the sidewall.

Hinge 510 is preferably a "living" hinge of a plastic material disposed between the top portion 382 and the sidewall 374 and extending along the entire length of both (see FIG. 32). In order to prevent water from streaming down the sidewall 374 and over a window 398 for example, a gutter 512 is disposed on the sidewall 374 along the entire length thereof with an upstanding end portion 514 forming a channel 516 between the top 382 and portion 514 when the sidewall 374 is in an upright position.

To ensure that water does not enter at the junction between the top 382 and sidewall 374, the top end 518 and the sidewall end 520 are of corresponding step construction so that the junction of the top 382 and sidewall 374 near their exterior surfaces is lower than the hinge 510 when the section is mounted on the rails 154, 156 with the sidewall 374 in an upright position.

The sidewalls 374 and 376, when mounted on the rails, compress the gaskets, such as 512, between the top section 382 and sidewall 374. This provides a "spring" return force, adding to the rigidity of the overall structure.

The combination structure, including the sealing and locking provisions, enables the assemblies to articulate, thereby accommodating all types of terrain with minimal wear.

Importantly, while the sealing and locking provisions permit the assemblies to articulate, they are configured as hereinabove described, so that the assemblies can be readily installed and removed from the truck.

Although particular embodiments of the invention have been described hereinabove, it is recognized that modifications and variations may readily occur to those skilled in the art and consequently it is intended that the claims be interpreted to cover such modifications and equivalents.

We claim:

1. A cover assembly for a truck having an open bed and a pair of sidewalls on opposite sides of the bed, comprising in combination:
    a pair of rails mounted respectively on said opposite sidewalls with both extending longitudinally thereof;
    a plurality of separate cover sections slidably and removably mounted on the rails in adjoining relationship while extending across the bed;
    means mounted on the separate cover sections for forming an elastic seal compressible between adjoining separate cover sections; and
    means for locking the separate cover sections in adjoining relationship on the rails with the elastic seals between adjoining cover sections in a compressed condition to form water resistant junctions between said sections.

2. The assembly of claim 1 wherein the locking means comprises:
    means carried by the rearmost cover section for actuation to a locked position and to an unlocked position; and,
    extender means operated by said last mentioned means upon actuation to the locked position to engage at least one of said rails to lock the rearmost section against movement and upon actuation to the unlocked position to relieve said engagement.

3. The assembly of claim 1 further comprising: a channel member mounted on the truck forwardly of said rails and spanning the distance between the rails; and, the foremost cover section and said channel being complementarily configured for engagement.

4. A cover assembly for a truck having an open bed and a pair of sidewalls on opposite sides of the bed, comprising in combination:
a pair of rails mounted respectively on said opposite sidewalls with both extending longitudinally thereof;
a plurality of separate cover sections slidably mounted on the rails and disposed in adjoining relationship while extending across the bed;
each pair of separate cover sections resides in adjoining relationship having corresponding edge portions extending across the bed and lying adjacent to one another;
means mounted on the separate cover sections for forming an elastic seal compressible between adjoining separate cover sections, said means for forming an elastic seal between adjoining cover sections comprising a depending flange wall disposed along the corresponding edge portion of one of each pair of cover sections adapted to reside in adjoining relationship; a depending trough disposed along the corresponding edge portion of the other of each pair of cover sections adapted to reside in adjoining relationship, said trough being sized to accommodate said depending flange wall in underlying and overlapping relationship therewith when the pair of cover sections reside in adjoining relationship, and said trough having a proximal upstanding wall; an elongated elastic seal member mounted on and extending along one of said walls for engagement by the other of said walls when the pair of cover sections reside in adjoining relationship; and
means for locking the separate cover sections in adjoining relationship on the rails.

5. A cover assembly for a truck having an open bed and a pair of sidewalls on opposite sides of the bed, comprising in combination:
a pair of rails mounted respectively on said opposite sidewalls with both extending longitudinally thereof;
a plurality of separate cover sections slidably mounted on the rails and disposed in adjoining relationship while extending across the bed,
each pair of separate cover sections resides in adjoining relationship having corresponding edge portions extending across the bed and lying adjacent to one another;
means mounted on the separate cover sections for forming an elastic seal compressible between adjoining separate cover sections, said means for forming an elastic seal between adjoining cover sections comprising a depending flange wall disposed along the sorresponding edge portion of one of each pair of cover sections adapted to reside in adjoining relationship; a depending trough disposed along the corresponding edge portion of the other of each pair of cover sections adapted to reside in adjoining relationship, said trough being sized to accommodate said depending flange wall in underlying and overlapping relationship therewith when the pair of cover sections reside in adjoining relationship; and said trough having a proximal upstanding wall; and an elongated elastic seal member mounted on the depending flange wall and extending therealong for engagement by the other of said walls when the pair of cover sections reside in adjoining relationship, the elastic seal member having a cross sectional configuration in the form of a trough; and
means for locking the separate cover sections in adjoining relationship on the rails.

6. A cover assembly for a truck having an open bed and a pair of sidewalls on opposite sides of the bed, comprising in combination:
a pair of rails mounted respectively on said opposite sidewalls with both extending longitudinally thereof; each rail having bottom, side and top walls forming a channel with a slot in the top wall which is narrower than the channel and each of said rails having a pair of gaps in its top wall;
a plurality of separate cover sections slidably mounted on the rails and disposed in adjoining relationship while extending across the bed;
said separate cover sections each having mounting feet slidably received and contained in the rail channels and the feet on at least one of said sections being smaller sized than said gaps and spaced apart in matching relationship with the rail gaps, thereby permitting installation and removal of said one section by aligning the feet thereof with the rail gaps without removing the remaining sections from the rails;
means mounted on the separate cover sections for forming an elastic seal compressible between adjoining separate cover sections; and,
means for locking the separate cover sections in adjoining relationship on the rails.

7. A cover assembly for a truck having an open bed and a pair of sidewalls on opposite sides of the bed, comprising:
a pair of rails mounted respectively on said opposite sidewalls with both extending longitudinally thereof, each rail having bottom, side and top walls forming a channel and each of said rails having a pair of gaps in its top wall;
a plurality of separate cover sections slidably mounted on the rails and disposed in adjoining relationship while extending across the bed, said separate cover sections each having mounting feet slidably received and contained in the rail channels, the feet on at least one of said sections being smaller sized than said gaps and spaced apart in matching relationship with the rail gaps, thereby permitting installation and removal of said one section by aligning the feet thereof with the rail gaps without removing the remaining sections from the rails;
means mounted on the separate cover sections for forming an elastic seal compressible between adjoining separate cover sections; and,
means for locking the separate cover section in adjoining relationship on the rails, the locking means including a mount member inserted through the rail slot into the channel and turned to form an interference fit therewith, said mount member including a block having a width less than said slot and a length approximately equal to the inside width of said channel and having a pair of diagonally opposite rounded corners so as to facilitate insertion and turning of said block in said channel, and a shank connected to said block and extending through said slot.

8. A cover assembly for a truck having an open bed and a pair of sidewalls on opposite sides of the bed, comprising in combination:
- a pair of rails mounted respectively on said opposite sidewalls with both extending longitudinally thereof, said rails being each in the form of an enclosed channel having a slot at the top thereof, and wherein each cover section has a protective sheet extending downwardly at either side thereof to a level below the top of the corresponding rail and lying outboard the slot in the rail, whereby to help keep out rain;
- a plurality of separate cover sections slidably mounted on the rails and disposed in adjoining relationship while extending across the bed;
- means mounted on the separate cover sections for forming an elastic seal compressible between adjoining separate cover sections; and,
- means for locking the separate cover sections in adjoining relationship on the rails.

9. A cover assembly for a truck having an open bed and a pair of sidewalls on opposite sides of the bed, comprising in combination:
- a pair of rails mounted respectively on said opposite sidewalls with both extending longitudinally thereof;
- a plurality of separate cover sections slidably mounted on the rails and disposed in adjoining relationship while extending across the bed;
- means mounted on the separate cover sections for forming an elastic seal compressible between adjoining separate cover sections; and,
- means for locking the separate cover sections in adjoining relationship on the rails, said locking means comprising a forward panel section affixed to the truck forward of the rails and extending thereacross, a rear panel section engaging the rails rearwardly of the rearmost section and extending thereacross, and manually actuable means carried by the rear panel section for locking the sections in adjoining relationship through engagement with at least one of said rails.

10. The assembly of claim 9 further comprising:
- seal means mounted on at least one of said forward and rear sections to insure a compressible elastic seal between all adjoining sections.

11. The assembly of claim 10 wherein the manually actuable means comprise:
- handle means carried by the rear section for actuation to a locked position and to an unlocked position; and,
- extender means operated by said handle means upon actuation to the locked position to engage at least one of said rails to lock the rear section against movement and upon actuation to the unlocked position to relieve said engagements.

12. A cover assembly for a truck having an open bed and a pair of sidewalls on opposite sides of the bed, comprising in combination:
- a pair of rails mounted respectively on said opposite sidewalls with both extending longitudinally thereof;
- a plurality of separate removable cover sections slidably mounted on the rails and disposed in adjoining relationship while extending across the bed; each of said cover sections having sidewalls comprising upright portions thereof and means connecting said portions to their respective sections for permitting collapsing of each cover section for storage;
- means mounted on the separate cover sections for forming an elastic seal compressible between adjoining separate cover sections; and,
- means for locking the separate cover sections in adjoining relationship on the rails.

13. A cover assembly for a truck having an open bed, a pair of sidewalls on opposite sides of the bed and a tailgate movable to an upright position between the sidewalls, comprising in combination:
- a pair of rails respectively mounted on said opposite sidewalls and extending longitudinally therealong for approximately the full length of the bed;
- a plurality of separate cover sections, including a rearmost cover section, slidably mounted on the rails and extending across the bed in adjoining relationship, each cover section having front and rear edge portions extending across the bed;
- means for locking the separate cover sections in adjoining relationship on the rails, said locking means comprising a member disposed on the rearmost cover section adjacent the rearward edge portion thereof and in a position to be engaged by the upright positioning of the tailgate; and,
- means mounted on the separate cover sections for forming an elastic seal between adjoining edge portions of adjoining separate cover sections when the sections are locked by the locking means.

14. An enclosing assembly for a pickup truck having an open bed, a forward wall, a rear wall and a pair of sidewalls on respective sides of the bed, comprising in combination:
- a pair of rails mounted respectively on said sidewalls with both rails extending longitudinally thereof;
- a plurality of separate sections each having a dimension sufficient to span the distance between said sidewalls, and when disposed in adjoining relationship, said sections together with said sidewalls, forward wall and rear wall enclosing said bed;
- at least some of said sections being slidably and removably mounted on said rails;
- means mounted on the separate sections for forming an elastic seal compressible between adjoining separate sections; and,
- means for locking the separate sections in adjoining relationship with the elastic seals between adjoining separate sections in a compressed condition to form water resistant junctions between said adjoining sections.

15. A cover assembly for a truck having an open bed, a pair of sidewalls on opposite sides of the bed, and a tailgate movable to an upright position between the sidewalls, comprising in combination:
- a pair of rails mounted respectively on said opposite sidewalls and extending longitudinally therealong for approximately the full length of the bed;
- a plurality of separate cover sections including a rearmost cover section slidably mounted on the rails and extending across the bed, each cover section having corresponding edge portions extending across the bed and lying adjacent to one another;

means for locking the separate cover sections in adjoining relationship on the rails and locking the tailgate in its upright position; and, means for forming an elastic seal between adjacent edge portions of adjoining separate cover sections when the sections are locked by the locking means;

said means for forming the elastic seal comprising a depending wall along the corresponding edge portion of one of adjacent cover sections adapted to reside in adjoining relationship;

an elongated U-shaped elastic member mounted on and extending along said depending wall; and, a depending trough disposed along the corresponding edge portion of the other of said adjacent cover sections adapted to reside in adjoining relationship, said trough being sized to accommodate said depending wall in underlying and overlapping relationship therewith when the adjacent cover sections reside in adjoining relationship, and said trough having a proximal wall engaging the elastic member mounted on said depending wall when the adjacent cover sections reside in adjoining relationship.

16. The assembly of claim 15 wherein the rearmost cover section further comprises a back panel section; and, detachable hinge means between the rearmost cover section and said back panel section for enabling opening and closing of the back panel section when the rearmost section is mounted on the rails.

17. A modular enclosure for a truck having an open bed and a pair of sidewalls on opposite sides of the bed, comprising in combination:

a pair of rails mounted respectively on said opposite sidewalls with both rails extending longitudinally thereof;

a plurality of separate enclosing sections each large enough to extend between said rails and when disposed in adjoining relationship, said sections enclosing said bed;

at least some of said sections being slidably and removably mounted on said rails;

means selectively mounted on the edges of the separate sections for forming an elastic seal compressible between adjoining separate sections; and, means for locking the separate sections in adjoining relationship with the elastic seals between adjoining sections in a compressed condition to form water resistant junctions between said sections.

18. The modular enclosure of claim 17 wherein the locking means comprises:

means carried by the rearmost section for actuation to a locked position and to an unlocked position; and, extender means operated by said last mentioned means upon actuation to the locked position to engage at least one of said rails to lock the rearmost section against movement and upon actuation to the unlocked position to relieve said engagement.

19. The modular enclosure of claim 17 wherein the plurality of sections comprises:

a forward panel section affixed to the truck forward of the rails and extending thereacross;

a rear panel section engaging the rails rearwardly of the rearmost section and extending thereacross;

further panel sections slidably carried by the rails; and, manually actuable means carried by the rear panel section for locking the sections in adjoining relationship through engagement with at least one of said rails.

20. The modular enclosure of claim 19 wherein the manually actuable means comprise:

handle means carried by the rearmost section for actuation to a locked position and to an unlocked position; and, extender means operated by said handle means upon actuation to the locked position to engage at least one of said rails to lock the rearmost section against movement and upon actuation to the unlocked position to relieve said engagements.

21. The modular enclosure of claim 17 further comprising:

a channel member mounted on the truck forwardly of said rails and spanning the distance between the rails; and, the foremost section and said channel being complementarily configured for engagement.

22. A modular enclosure for a truck having an open bed and a pair of sidewalls on opposite sides of the bed, comprising in combination:

a pair of rails mounted respectively on said opposite sidewalls with both rails extending longitudinally thereof;

a plurality of separate enclosing sections each large enough to extend between said rails and when disposed in adjoining relationship, said sections enclosing said bed, said plurality of sections comprising a forward panel section affixed to the truck forward of the rails and extending thereacross, a rear panel section engaging the rails rearwardly of the rearmost section and extending thereacross, further panel sections slidably carried by the rails, and manually actuable means carried by the rear panel section for locking the sections in adjoining relationship through engagement with at least one of said rails;

at least some of said sections being slidably mounted on said rails;

means selectively mounted on the edges of the separate sections for forming an elastic seal compressible between adjoining separate sections;

means for locking the separate sections in adjoining relationship; and, means mounted to the further panel sections for latching adjacent pairs of said further panel sections in adjoining relationship with the elastic seal compressed therebetween, said latching means allowing articulation between said adjacent pairs when said further panel sections are locked together and mounted on the rails.

23. A modular enclosure for a truck having an open bed and a pair of sidewalls on opposite sides of the bed, comprising in combination:

a pair of rails mounted respectively on said opposite sidewalls with both rails extending longitudinally thereof;

a plurality of separate removable enclosing sections each large enough to extend between said rails and when disposed in adjoining relationship, said sections enclosing said bed; at least some of said sections being slidably mounted on said rails, each of said sections having sidewalls comprising upright portions thereof including means connecting said sidewalls to the rest of its section for permitting collapsing of each section for storage;

means selectively mounted on the edges of the separate sections for forming an elastic seal compressible between adjoining separate sections; and, means for locking the separate sections in adjoining relationship.

24. A cover assembly for a truck having an open bed and a pair of sidewalls on opposite sides of the bed, comprising in combination:

a pair of rails mounted respectively on said opposite sidewalls with both extending longitudinally thereof;

a plurality of separate cover sections slidably mounted on the rails and disposed in adjoining relationship while extending across the bed;

means mounted on the separate cover sections for forming an elastic seal compressible between adjoining separate cover sections;

means mounted on the cover sections for latching together adjacent pairs of the cover sections in adjoining relationship with the elastic seal compressed therebetween, said latching means allowing articulation between said cover sections when said cover sections are latched together and mounted on the rails; and, means for locking the separate cover sections in adjoining relationship on the rails.

25. Pickup truck cover apparatus, which comprises:

(a) a pair of rails adapted for mounting to upper surfaces of opposing sidewalls defining pickup truck beds, and (b) a plurality of truck bed cover sections configured for being slidably and removably mounted to said rails when the rails are mounted to a pickup truck bed, said cover sections including a plurality of first, interchangeable cover sections each having a selected longitudinal length and transverse width and a plurality of second sections having the same transverse width as the first sections but having different longitudinal lengths selected to accommodate pickup truck beds having different lengths, truck pickup bed covers being thereby formed by at least one first cover section and a selected second cover section mounted to said pair of rails.

26. The apparatus as claimed in claim 25, wherein said second cover sections include rearwardmost cover sections and wherein at least some of said rearwardmost panels are differently configured to fit differently configured rearward ends of truck beds.

27. The apparatus as claimed in claim 25, wherein said first and second sections include different types of interchangeable sections whereby different cover functions may be provided for the pickup truck bed with which the cover sections are used.

* * * * *